(12) United States Patent
Hattori

(10) Patent No.: US 10,138,949 B2
(45) Date of Patent: Nov. 27, 2018

(54) FRICTION ENGAGEMENT ELEMENT

(71) Applicant: AISIN AW CO., LTD., Anjo-shi, Aichi-ken (JP)

(72) Inventor: Nakatsune Hattori, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 482 days.

(21) Appl. No.: 14/917,490

(22) PCT Filed: Sep. 29, 2014

(86) PCT No.: PCT/JP2014/075858
§ 371 (c)(1),
(2) Date: Mar. 8, 2016

(87) PCT Pub. No.: WO2015/046503
PCT Pub. Date: Apr. 2, 2015

(65) Prior Publication Data
US 2016/0215830 A1    Jul. 28, 2016

(30) Foreign Application Priority Data

Sep. 30, 2013  (JP) .................................. 2013-203262

(51) Int. Cl.
| | |
|---|---|
| *F16D 13/74* | (2006.01) |
| *F16D 13/52* | (2006.01) |
| *F16D 25/0638* | (2006.01) |
| *F16D 13/68* | (2006.01) |
| *F16D 25/12* | (2006.01) |

(52) U.S. Cl.
CPC ............. *F16D 13/74* (2013.01); *F16D 13/52* (2013.01); *F16D 13/683* (2013.01); *F16D 25/0638* (2013.01); *F16D 25/123* (2013.01)

(58) Field of Classification Search
None
See application file for complete search history.

(56) References Cited

U.S. PATENT DOCUMENTS

| | | | | |
|---|---|---|---|---|
| 4,585,096 | A | * | 4/1986 | Bok ...................... F16D 13/648 188/71.5 |
| 5,094,331 | A |   | 3/1992 | Fujimoto et al. |
| 5,188,374 | A | * | 2/1993 | Gorman ............. F16D 25/0632 277/500 |
| 5,577,582 | A | * | 11/1996 | Lindsay .................. F16D 13/52 188/218 XL |

(Continued)

FOREIGN PATENT DOCUMENTS

| | | |
|---|---|---|
| JP | H01-140028 U | 9/1989 |
| JP | 2000-145819 A | 5/2000 |

(Continued)

OTHER PUBLICATIONS

Dec. 22, 2014 Search Report issued in International Patent Application No. PCT/JP2014/075858.

*Primary Examiner* — Colby M Hansen
(74) *Attorney, Agent, or Firm* — Oliff PLC

(57) ABSTRACT

A wet friction engagement element including a drum having a cylindrical drum portion; a hub having a cylindrical hub portion; an annular friction plate fitted in an inner periphery of the drum portion and having a friction material bonded to its surface; and an annular separator plate fitted on an outer periphery of the hub portion and capable of frictionally engaging with the friction plate.

16 Claims, 6 Drawing Sheets

(56) References Cited

U.S. PATENT DOCUMENTS

| | | | | |
|---|---|---|---|---|
| 5,755,314 A | * | 5/1998 | Kanda | F16D 25/0638 |
| | | | | 192/113.35 |
| 6,725,989 B1 | * | 4/2004 | Krisher | B60K 23/0808 |
| | | | | 192/103 F |
| 2008/0006504 A1 | | 1/2008 | Sudau et al. | |

FOREIGN PATENT DOCUMENTS

| | | | |
|---|---|---|---|
| JP | 2002-081463 | A | 3/2002 |
| JP | 2002-106597 | A | 4/2002 |
| JP | 2004-176915 | A | 6/2004 |
| JP | 2008-014493 | A | 1/2008 |
| JP | 2011-213190 | A | 10/2011 |

\* cited by examiner

FIG. 2

|   |   | C1 | C2 | C3 | B1 | B2 | F1 |
|---|---|---|---|---|---|---|---|
| P |   |   |   |   |   |   |   |
| REV |   |   |   | ○ |   | ○ |   |
| N |   |   |   |   |   |   |   |
| D | 1st | ○ |   |   |   | ● | ○ |
|   | 2nd | ○ |   |   | ○ |   |   |
|   | 3rd | ○ |   | ○ |   |   |   |
|   | 4th | ○ | ○ |   |   |   |   |
|   | 5th |   | ○ | ○ |   |   |   |
|   | 6th |   | ○ |   | ○ |   |   |

※○: ENGAGED
●: ENGAGED WHEN ENGINE BRAKING IS IN OPERATION.

FRICTION ENGAGEMENT ELEMENT

BACKGROUND

The present disclosure relates to wet friction engagement elements including annular friction plates each having a friction material bonded to its surface and annular separator plates capable of frictionally engaging with the friction plates.

Conventionally, wet multi-plate clutches including annular friction plates meshing with splines formed in the outer periphery of a hub and each having a friction material bonded thereto and annular separator plates meshing with splines formed in the inner periphery of a drum are known as this type of friction engagement element (see, e.g., Japanese Patent Application Publication No. 2000-145819). In this wet multi-plate clutch, a plurality of lubricant oil supply holes are formed in the hub. A plurality of oil through grooves extending from the inner peripheral edge to the outer peripheral edge of the friction material of the friction plate are formed such that their openings at the inner peripheral edge face lubricant oil supply holes. This allows the lubricant oil that is supplied from the lubricant oil supply holes throughout the spaces between each friction plate and each separator plate via the oil through grooves to flow more smoothly, and thus allows the lubricant oil to be discharged from the spaces between each friction plate and each separator plate in a more desirable manner.

As this type of friction engagement element, a wet multi-plate clutch is also known which includes a plurality of metal plates fitted in the inner periphery of an input drum and a plurality of facing plates fitted on the outer periphery of an input clutch hub and each having a friction material facing bonded to its both surfaces (see, e.g., Japanese Patent Application Publication No. 2002-106597). In this wet multi-plate clutch, oil grooves are formed in the surface of each metal plate so as to extend from the inner radial side toward the outer radial side, and clearance extending in the circumferential direction is provided between the inner periphery of the input drum and the outer radial ends of the oil grooves of each metal plate. Lubricant oil used to lubricate the metal plates and the facing plates thus flows in the axial direction of the wet multi-plate clutch from each oil groove to the spaces between the input drum and the plurality of metal plates through the clearance, and is discharged to the outside of the input drum through oil discharge openings formed in the input drum. A method in which a plurality of segments made of a friction material are bonded at intervals to a core plate having external teeth and a plurality of grooves are formed between the segments is also known as a method for manufacturing a wet friction clutch plate for use in this type of friction engagement element (see, e.g., Japanese Patent Application Publication No. 2004-176915).

SUMMARY

In the wet multi-plate clutch described in Japanese Patent Application Publication No. 2000-145819, lubricant oil can be discharged from the spaces between each friction plate and each separator plate in a more desirable manner. However, if the lubricant oil is not satisfactorily discharged to the outside of the drum and stays inside the drum, a relatively large amount of lubricant oil is present between each friction plate and each separator plate. Accordingly, drag torque due to viscous shear resistance of the lubricant oil may not be satisfactorily reduced when the wet multi-plate clutch is in a disengaged state. In the wet multi-plate clutch described in Japanese Patent Application Publication No. 2002-106597, lubricant oil having flowed in the oil grooves and the clearance can be discharged to the outside of the input drum through the openings formed in the input drum. In this wet multi-plate clutch, however, since the oil grooves are formed in the metal plates, peeling, chipping, etc. of the friction materials may occur as the edges of the oil grooves contact the friction materials of the facing plates when the facing plates frictionally engage with the metal plates.

The present disclosure according to an exemplary aspect further reduces drag torque that is generated when a friction engagement element is not engaged, while more satisfactorily protecting a friction material bonded to a friction plate.

A friction engagement element according to an exemplary aspect of the present disclosure is a wet friction engagement element including a drum having a cylindrical drum portion, a hub having a cylindrical hub portion, an annular friction plate fitted in an inner periphery of the drum portion and having a friction material bonded to its surface, and an annular separator plate fitted on an outer periphery of the hub portion and capable of frictionally engaging with the friction plate, wherein the drum portion has splines on which a plurality of external teeth formed in the friction plate are fitted, and a plurality of through holes formed in grooves of the splines, the friction plate has a plurality of oil grooves formed at intervals in a circumferential direction of the friction plate and extending in a radial direction of the friction plate, and each of the plurality of oil grooves is located next to its adjacent one of the external teeth in the radial direction as viewed in an axial direction of the friction plate.

In this friction engagement element, the annular friction plate having the friction material bonded to its surface is fitted in the inner periphery of the cylindrical drum portion of the drum, and the annular separator plate capable of frictionally engaging with the friction plate is fitted on the outer periphery of the cylindrical hub portion of the hub. The drum portion has the splines on which the plurality of external teeth formed in the friction plate are fitted, and the plurality of through holes formed in the grooves of the splines. The friction plate has the plurality of oil grooves formed at intervals in the circumferential direction of the friction plate and extending in the radial direction of the friction plate. Forming the plurality of oil grooves in the friction plate having the friction material bonded thereto can more satisfactorily suppress peeling, chipping, etc. of the friction material when the friction plate frictionally engages with the separator plate with the friction material interposed therebetween, as compared to the case where the plurality of oil grooves are formed in the separator plate. Each of the plurality of oil grooves is formed next to its adjacent one of the external teeth in the radial direction as viewed in an axial direction of the friction plate. Lubricant oil supplied throughout the spaces between the friction material of the friction plate and the separator plate can thus be smoothly guided from each oil groove to the groove of the splines of the drum portion in which the external tooth adjacent to the oil groove is fitted, and can be satisfactorily discharged from each through hole to the outside of the drum portion. The lubricant oil can thus be more satisfactorily controlled not to stay inside the drum portion. This can more satisfactorily suppress generation of drag torque due to viscous shear resistance of lubricant oil that is present between the friction plate and the separator plate when the friction plate and the separator plate are in a disengaged state. In this friction engagement element, the friction material bonded to the friction plate can therefore be more satisfactorily protected, and drag torque that is generated when the friction engagement element is in a disengaged state can further be reduced.

Each of the plurality of oil grooves may be located next to its adjacent one of the through holes in the radial direction as viewed in the axial direction of the friction plate, and the plurality of through holes may be formed in the drum portion so as to overlap the friction plate as viewed in the radial direction. The lubricant oil can thus be more smoothly guided from each oil groove to the through hole adjacent to the oil groove, and the lubricant oil can be more satisfactorily discharged to the outside of the drum portion through each through hole.

The drum portion may have the splines formed in the inner periphery, the plurality of through holes may be formed such that outside of the drum portion communicates with the grooves of the splines, the friction plate may have the plurality of external teeth that are fitted in the grooves of the splines, and each of the plurality of oil grooves may be formed radially inward of its adjacent one of the external teeth. By fitting the external teeth of the friction plate which are located radially outward of the oil grooves in the grooves of the splines of the drum portion which communicate with the through holes, each oil groove can be located next to its adjacent one of the through holes in the radial direction as viewed in the axial direction.

An opening of the oil groove which is located on an inner peripheral side of the friction plate may be formed so as to narrow as closer to an outer peripheral side of the friction plate. This can increase the flow velocity of the lubricant oil flowing in the oil grooves. The lubricant oil can thus flow straighter in each oil groove, and the lubricant oil can be more satisfactorily discharged to the outside of the drum portion through the oil grooves and the through holes adjacent to the oil grooves.

The friction material may have a plurality of non-through grooves each formed between the oil grooves adjoining each other and each opening on the inner peripheral side of the friction plate, and each of the plurality of non-through grooves may be formed next to its adjacent one of the through holes in the radial direction as viewed in the axial direction. The friction plate and the separator plate are thus subjected to a force in such a direction that the friction plate and the separator plate are separated from each other due to an oil pressure of the lubricant oil having flowed into the non-through grooves of the friction material. Clearance between the friction plate and the separator plate can thus be more properly maintained, which can further reduce drag torque that is generated between the friction plate and the separator plate. Moreover, since each of the non-through grooves is formed next to its adjacent one of the through holes in the radial direction as viewed in the axial direction, lubricant oil having flowed into the non-through grooves and thus having a reduced flow velocity can thus be satisfactorily discharged to the outside of the drum portion through the through holes.

BRIEF DESCRIPTION OF THE DRAWINGS

FIG. 2 is an operation table showing the relationship between shift speeds and the operating states of clutches and brakes of the automatic transmission included in the power transmission device of FIG. 1.

DETAILED DESCRIPTION OF EMBODIMENTS

Modes for carrying out the present disclosure will be described with reference to the accompanying drawings.

Figure 1:
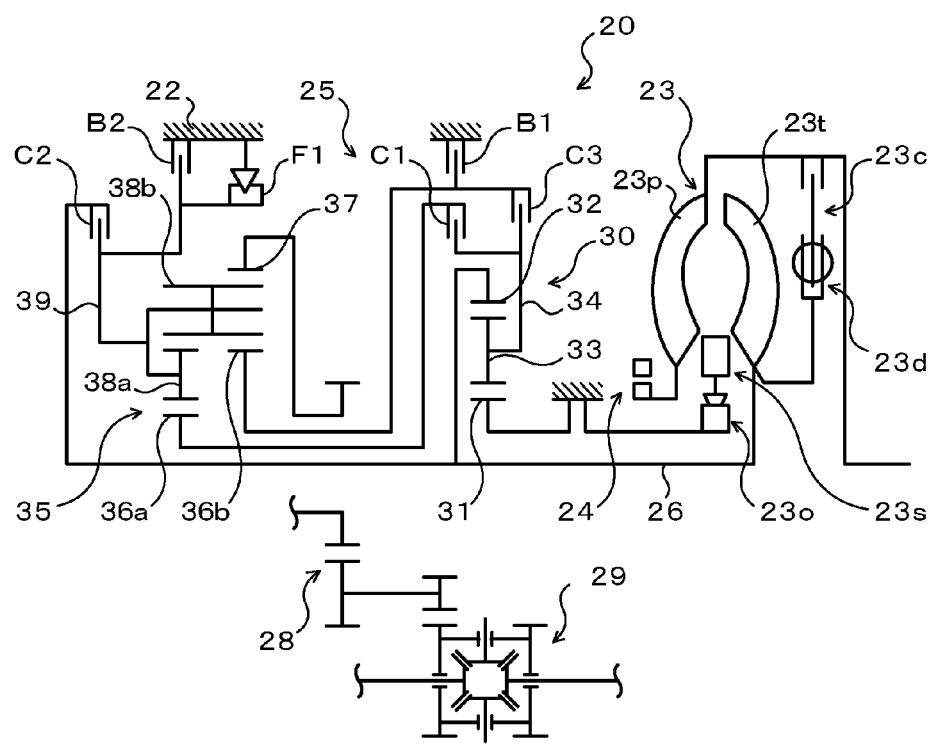
FIG. 1 is a schematic configuration diagram of a power transmission device including an automatic transmission having clutches as friction engagement elements according to an embodiment of the present disclosure.

FIG. 1 is a schematic configuration diagram of a power transmission device 20 including an automatic transmission 25 having a clutch C1 as a friction engagement element according to an embodiment of the present disclosure. The power transmission device 20 shown in the figure is connected to a crankshaft of an engine, not shown, which is mounted on a front wheel drive vehicle, and can transmit power from the engine to right and left drive wheels, not shown. As shown in the figure, the power transmission device 20 includes a transmission case 22, a starting device (torque converter) 23, an oil pump 24, the automatic transmission 25, a gear mechanism (gear train) 28, a differential gear (differential mechanism) 29, etc. which are accommodated in the transmission case 22.

The starting device 23 included in the power transmission device 20 is configured as a torque converter having an input-side pump impeller 23p connected to the crankshaft of the engine, an output-side turbine runner 23t connected to an input shaft (input member) 26 of the automatic transmission 25, a stator 23s placed inside the pump impeller 23p and the turbine runner 23t to adjust the flow of hydraulic oil from the turbine runner 23t to the pump impeller 23p, a one-way clutch 23o that allows the stator 23s to rotate only in one direction, a lockup clutch 23c, a damper mechanism 23d, etc. The starting device 23 may be configured as a fluid coupling that does not have the stator 23s.

The oil pump 24 is configured as a gear pump having a pump assembly including a pump body and a pump cover, an external gear connected to the pump impeller 23p of the starting device 23 via a hub, an internal gear meshing with the external gear, etc. The oil pump 24 is driven by the power from the engine to suck hydraulic oil (ATF) stored in an oil pan, not shown, to pressure-feed the sucked hydraulic oil to a hydraulic control device, not shown, which generates an oil pressure required by the starting device 23 and the automatic transmission 25.

The automatic transmission 25 is configured as a six-speed transmission. As shown in FIG. 1, the automatic transmission 25 includes, in addition to the input shaft 26, a double-pinion type first planetary gear mechanism 30, a Ravigneaux type second planetary gear mechanism 35, three clutches C1, C2, C3 that change a power transmission path from the input side to the output side, two brakes B1, B2, and a one-way clutch F1.

The first planetary gear mechanism 30 of the automatic transmission 25 has a sun gear 31 as an external gear, a ring gear 32 as an internal gear placed concentrically with the sun gear 31, a plurality of pinion gears 33 meshing with the sun gear 31 and meshing with the ring gear 32, and a planetary carrier 34 that rotatably (turnably) and revolvably holds the plurality of pinion gears 33. As shown in the figure, the sun gear 31 of the first planetary gear mechanism 30 is fixed to the transmission case 22, and the ring gear 32 of the first planetary gear mechanism 30 is coupled to the input shaft 26 so as to be able to rotate together with the input shaft 26.

The second planetary gear mechanism 35 has a first sun gear 36a and a second sun gear 36b as external gears, a ring gear 37 as an internal gear placed concentrically with the first and second sun gears 36a, 36b, a plurality of short pinion gears 38a meshing with the first sun gear 36a, a plurality of long pinion gears 38b meshing with the second sun gear 36b and the plurality of short pinion gears 38a and meshing with the ring gear 37, and a planetary carrier 39 that rotatably (turnably) and revolvably holds the plurality of short pinion gears 38a and the plurality of long pinion gears 38b. The ring gear 37 of the second planetary gear mechanism 35 functions as an output member of the automatic transmission 25, and the power transmitted from the input shaft 26 to the ring gear 37 is transmitted to the right and left driving wheels, not shown, via the gear mechanism 28 and the differential gear 29. The planetary carrier 39 is supported by the transmission case 22 via the one-way clutch F1, and the one-way clutch F1 allows the planetary carrier 39 to rotate only in one direction.

The clutch C1 is a multi-plate friction hydraulic clutch (friction engagement element) that has a hydraulic servo formed by a piston, a plurality of friction plates and separator plates, an oil chamber to which hydraulic oil is supplied, etc. and that can connect and disconnect the planetary carrier 34 of the first planetary gear mechanism 30 and the first sun gear 36a of the second planetary gear mechanism 35. The clutch C2 is a multi-plate friction hydraulic clutch that has a hydraulic servo formed by a piston, a plurality of friction plates and separator plates, an oil chamber to which hydraulic oil is supplied, etc. and that can connect and disconnect the input shaft 26 and the planetary carrier 39 of the second planetary gear mechanism 35. The clutch C3 is a multi-plate friction hydraulic clutch that has a hydraulic servo formed by a piston, a plurality of friction plates and separator plates, an oil chamber to which hydraulic oil is supplied, etc. and that can connect and disconnect the planetary carrier 34 of the first planetary gear mechanism 30 and the second sun gear 36b of the second planetary gear mechanism 35.

The brake B1 is a multi-plate friction hydraulic brake that has a hydraulic servo formed by a plurality of friction plates and separator plates, an oil chamber to which hydraulic oil is supplied, etc. and that can hold the second sun gear 36b of the second planetary gear mechanism 35 stationary to the transmission case 22 such that the second sun gear 36b cannot rotate, and can release the second sun gear 36b held stationary to the transmission case 22. The brake B2 is a multi-plate friction hydraulic brake that has a hydraulic servo formed by a plurality of friction plates and separator plates, an oil chamber to which hydraulic oil is supplied, etc. and that can hold the planetary carrier 39 of the second planetary gear mechanism 35 stationary to the transmission case 22 such that the planetary carrier 39 cannot rotate, and can release the planetary carrier 39 held stationary to the transmission case 22.

The one-way clutch F1 includes an inner race coupled (fixed) to the planetary carrier 39 of the second planetary gear mechanism 35, an outer race, a plurality of sprags, a plurality of springs (leaf springs), a cage, etc. The one-way clutch F1 transmits torque via the sprags when the outer race rotates in one direction relative to the inner race. The one-way clutch F1 rotates both the inner race and the outer race relative to each other when the outer race rotates in the other direction relative to the inner race. The one-way clutch F1 may be a clutch having a configuration other than that of the sprag clutch, such as a roller clutch.

The clutches C1 to C3 and the brake B1, B2 operate according to supply and discharge of hydraulic oil by the hydraulic control device, not shown. FIG. 2 shows an operation table showing the relationship between shift speeds of the automatic transmission 25 and the operating states of the clutches C1 to C3 and the brakes B1, B2. The automatic transmission 25 provides first to sixth forward speeds and a reverse speed by bringing the clutches C1 to C3 and the brakes B1, B2 into the states shown in the operation table of FIG. 2. At least one of the clutches C2, C3 other than the clutch C1, and the brakes B1, B2 may be a meshing engagement element such as a dog clutch.

Figure 3:
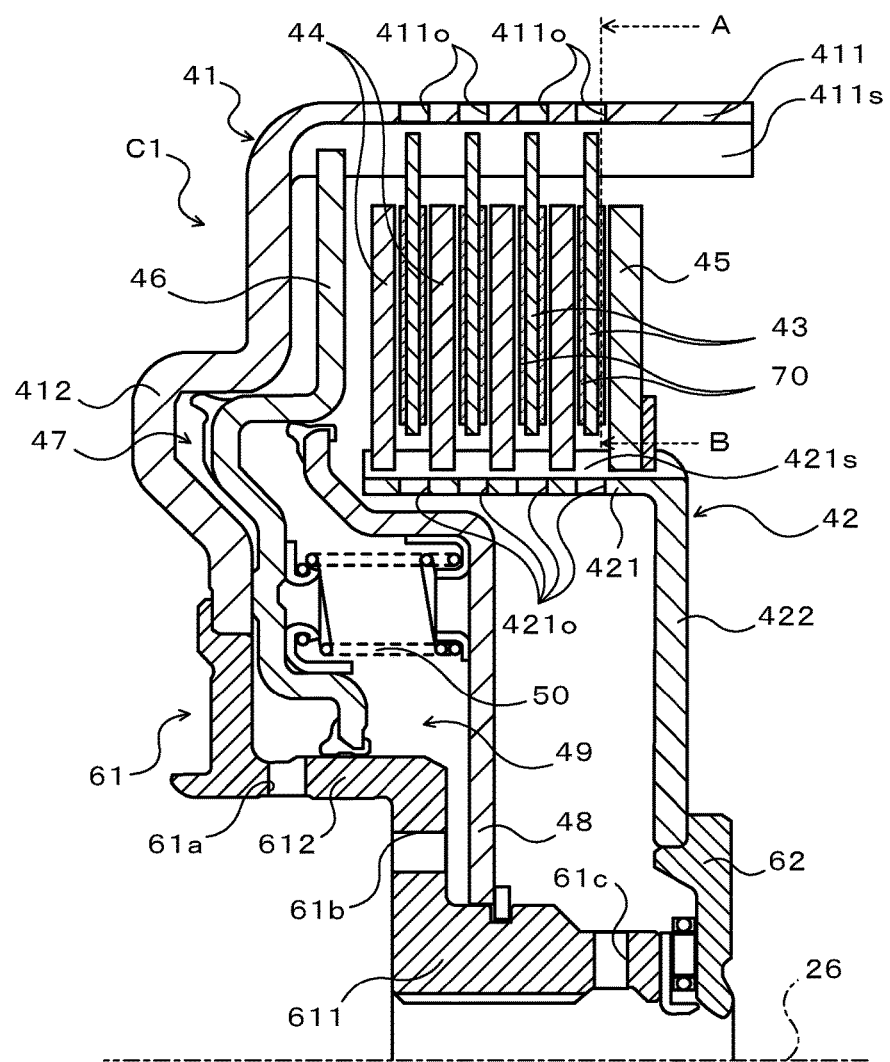
FIG. 3 is an enlarged sectional view showing a main part of the power transmission device of FIG. 1.
Figure 4:
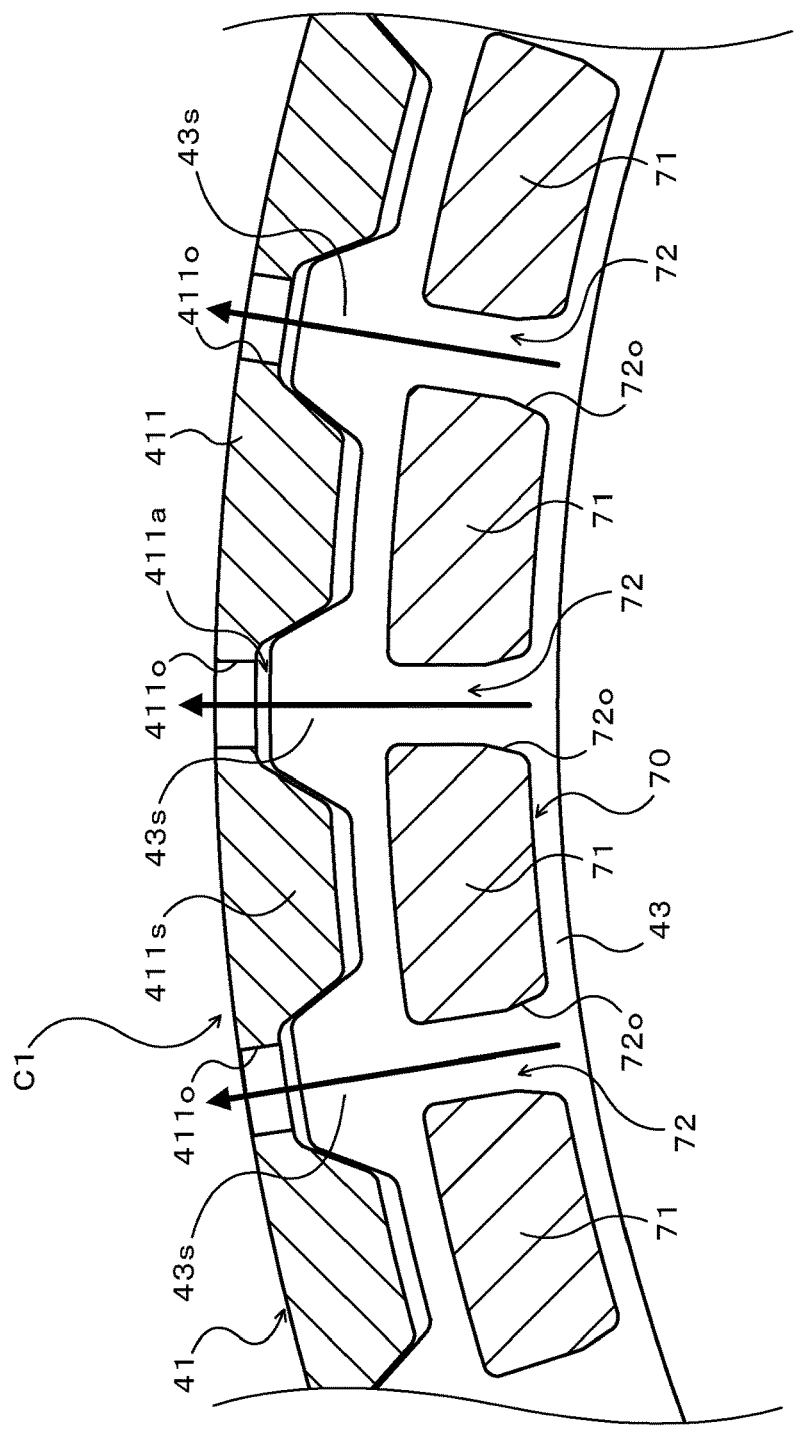
FIG. 4 is a sectional view taken along line A-B in FIG. 3.

The clutch C1 included in the automatic transmission 25 will be described in detail below with reference to FIGS. 3 and 4. FIG. 3 is an enlarged sectional view showing the clutch C1 as a main part of the power transmission device 20, and FIG. 4 is a sectional view of the clutch C1 taken along line A-B in FIG. 3. Since the axial and radial directions of each component of the clutch C1 match the axial and radial directions of the input shaft 26 of the automatic transmission 25, the axial direction of the input shaft 26 is hereinafter simply referred to as the "axial direction," and the radial direction of the input shaft 26 is hereinafter simply referred to as the "radial direction."

The clutch C1 is configured as a wet multi-plate friction hydraulic clutch (friction engagement element) including a clutch drum (drum) 41, a clutch hub (hub) 42 placed inside the clutch drum 41, a plurality of friction plates 43 that are fitted in the clutch drum 41, a plurality of separator plates 44 and a backing plate 45 which are fitted on the clutch hub 42, a piston 46 that receives an engagement oil pressure supplied to an engagement oil chamber 47 and presses the friction plates 43 and the separator plates 44 to frictionally engage the friction plates 43 with the separator plates 44, a cancel plate 48 that defines a cancel oil chamber 49, and a plurality of return springs (coil springs) 50 that bias the piston 46 in such a direction that the piston 46 is separated from the friction plates 43 and the separator plates 44.

The clutch drum 41 has a cylindrical drum portion 411 and a sidewall portion 412 extended radially inward from one end (the left end in FIG. 3) of the drum portion 411. Splines 411s are formed in the inner periphery of the drum portion 411. The inner periphery of the sidewall portion 412 is fixed to a drum-side coupling member 61. The drum-side coupling member 61 has a first cylindrical portion 611 extending in the axial direction such that the input shaft 26 is surrounded, and a second cylindrical portion 612 having a larger diameter than the first cylindrical portion 611. The first cylindrical portion 611 is coupled to the first sun gear 36a of the second planetary gear mechanism 35 via a coupling member, not shown. The clutch drum 41 is thus coupled to the first sun gear 36a of the second planetary gear mechanism 35 via the drum-side coupling member 61 and the coupling member, not shown.

The clutch hub 42 has a cylindrical hub portion 421 and a sidewall portion 422 extending radially inward from one end located on the opposite side (the right side in FIG. 3) of the hub portion 421 from the clutch drum 41. Splines 421s are formed in the outer periphery of the hub portion 421. The inner periphery of the sidewall portion 422 is fixed to the outer periphery of a hub-side coupling member 62. The hub-side coupling member 62 is coupled to the planetary carrier 34 of the first planetary gear mechanism 30. The clutch hub 42 is thus coupled to the planetary carrier 34 of the first planetary gear mechanism 30 via the hub-side coupling member 62.

As shown in FIGS. 3 and 4, the friction plate 43 is an annular member having a friction material 70 bonded to its both surfaces, and has a plurality of external teeth 43s that are fitted in grooves 411a of the splines 411s formed in the inner periphery of the drum portion 411 of the clutch drum 41. As shown in FIG. 4, the friction material 70 is divided into a plurality of segments 71, and the segments 71 are bonded to the friction plate 43 at intervals in the circumferential direction of the friction plate 43. The separator plate 44 is an annular member both surfaces of which are smooth surfaces. The separator plates 44 are fitted on the splines 421s formed in the hub portion 421 of the clutch hub 42 such that the separator plates 44 are arranged alternately with the plurality of friction plates 43 fitted in the drum portion 411. The backing plate 45 is fitted on the splines 421s of the hub portion 421 such that the backing plate 45 can contact the rightmost friction plate 43 in FIG. 3. The backing plate 45 is supported in the axial direction by a snap ring fitted on the splines 421s.

The piston 46 is supported by the second cylindrical portion 612 of the drum-side coupling member 61 and the sidewall portion 412 of the clutch drum 41 such that the piston 46 can move in the axial direction. The piston 46 has external teeth formed in its outer periphery so as to be fitted on the splines 411s formed in the drum portion 411. A seal member is placed between the piston 46 and the second cylindrical portion 612 of the drum-side coupling member 61 and between the piston 46 and the sidewall portion 412 of the clutch drum 41. The piston 46 together with the sidewall portion 412 of the clutch drum 41 and the second cylindrical portion 612 of the drum-side coupling member 61 thus defines the engagement oil chamber 47 to which an engagement oil pressure for engaging the clutch C1 is supplied. The engagement oil chamber 47 is connected to the hydraulic control device, not shown, via an oil hole 61a formed in the second cylindrical portion 612 of the drum-side coupling member 61.

The cancel plate 48 is supported in the radial direction by the piston 46 and the first cylindrical portion 611 of the drum-side coupling member 61 and is supported in the axial direction by a snap ring attached to the first cylindrical portion 611 at a position on the clutch hub 42 side (the right side in FIG. 3) of the piston 46. A seal member is placed between the cancel plate 48 and the piston 46. The cancel plate 48 together with the piston 46 and the drum-side coupling member 61 thus defines the cancel oil chamber 49 that cancels an oil pressure generated in the engagement oil chamber 47. The cancel oil chamber 49 is connected to the hydraulic control device, not shown, via an oil hole 61b formed in the drum-side coupling member 61. The plurality of return springs 50 are placed between the piston 46 and the cancel plate 48 in the cancel oil chamber 49. Instead of the plurality of coil springs, a single leaf spring may be used as the return springs 50 of the clutch C1.

A structure for lubricating and cooling the plurality of friction plates 43 and the plurality of separator plates 44 of the clutch C1 will be described below. As shown in FIG. 3, a plurality of oil holes 61c are formed in the first cylindrical portion 611 of the drum-side coupling member 61 such that the inside of the clutch hub 42 (the space between the clutch hub 42 and the cancel plate 48) communicates with the inside of the first cylindrical portion 611. Each oil hole 61c is connected to a lubricating system of the hydraulic control device, not shown, which supplies hydraulic oil as a lubricating/cooling medium to elements to be lubricated in the automatic transmission 25.

As shown in FIG. 3, the hub portion 421 of the clutch hub 42 has a plurality of supply holes 421o formed at intervals in the circumferential direction of the hub portion 421. The plurality of supply holes 421o are formed such that the space inside the hub portion 421 communicates with grooves of the splines 421s formed in the hub portion 421. As shown in FIG. 3, the plurality of supply holes 421o are formed at intervals in the axial direction so as to overlap each friction plate 43 as viewed in the radial direction. The plurality of supply holes 421o may be formed at positions offset in the axial direction from the friction plates 43 as viewed in the radial direction. The plurality of oil holes 61c of the drum-side coupling member 61 and the plurality of supply holes 421o of the clutch hub 42 form a path for supplying hydraulic oil as a lubricating/cooling medium from the lubricating system of the hydraulic control device throughout the spaces between each friction plate 43 and each separator plate 44.

The drum portion 411 of the clutch drum 41 has a plurality of discharge holes (through holes) 411o formed at intervals in the circumferential direction of the drum portion 411. As shown in FIG. 4, the plurality of discharge holes 411o are formed such that the space outside the drum portion 411 communicates with the grooves 411a of the splines 411s formed in the drum portion 411. As shown in FIG. 3, the plurality of discharge holes 411o are formed at intervals in the axial direction so as to overlap each friction plate 43 as viewed in the radial direction. The plurality of discharge holes 411o form a path for discharging hydraulic oil that has lubricated and cooled the friction plates 43 and the separator plates 44 to the outside of the clutch drum 41.

As shown in FIG. 4, the friction plate 43 has a plurality of oil grooves 72 formed at intervals in the circumferential direction of the friction plates 43 and extending in the radial direction. Each of the plurality of oil grooves 72 is formed between the segments 71 that adjoin each other and are included in the friction material 70 bonded to the friction plate 43, and functions as a path for discharging hydraulic oil supplied throughout the spaces between the friction plate 43 and the separator plate 44 toward the drum portion 411. Forming the plurality of oil grooves 72 in each friction plate 43 having the friction material 70 bonded thereto can more satisfactorily suppress peeling, chipping, etc. of the friction material 70 when the friction plate 43 frictionally engages with the separator plate 44 with the friction material 70 interposed therebetween, as compared to the case where the plurality of oil grooves 72 are formed in each separator plate 44. The friction materials 70 bonded to the friction plates 43 can therefore be more satisfactorily protected.

As shown in FIG. 4, each of the plurality of oil grooves 72 is formed radially inward of its adjacent external tooth 43s of the friction plate 43, and is located next to the adjacent external tooth 43s in the radial direction as viewed in the axial direction of the friction plate 43. By fitting the external teeth 43s located radially outward of the oil grooves 72 in the grooves 411a of the splines 411s of the drum portion 411 which communicate with the discharge holes 411o, each oil groove 72 can be located next to its adjacent discharge hole 411o in the radial direction as viewed in the axial direction. An opening 72o of each oil groove 72 which is located on the inner peripheral side of the friction plate 43 (hereinafter simply referred to as the "inner peripheral side") is formed so as to narrow as closer to the outer peripheral side of the friction plate 43 (hereinafter simply referred to as the "outer peripheral side"). The openings 72o can be easily formed by cutting out a part on the inner peripheral side of each segment 71 of the friction material 70.

In the clutch C1 configured as described above, when hydraulic oil is supplied from the hydraulic control device to the engagement oil chamber 47 via the oil hole 61a and the oil pressure in the engagement oil chamber 47 increases accordingly, the piston 46 moves toward the friction plates 43 and the separator plates 44 and presses the friction plates 43 and the separator plates 44 against the backing plate 45 fixed to the clutch drum 41. The friction plates 43 thus frictionally engage (fully engage or slip-engage) with the separator plates 44 with the friction material 70 interposed therebetween, and the clutch drum 41 is coupled to the clutch hub 42. At this time, hydraulic oil is supplied from the hydraulic control device to the cancel oil chamber 49 via the oil hole 61b, and a force that is applied to the piston 46 by a centrifugal oil pressure generated in the engagement oil chamber 47 can be cancelled by a centrifugal oil pressure generated in the cancel oil chamber 49. If the oil pressure that is supplied from the hydraulic control device to the engagement oil chamber 47 decreases, the piston 46 is biased by the plurality of return springs 50 and is separated from the friction plates 43. The friction plates 43 are thus frictionally disengaged from the separator plates 44, and the clutch drum 41 is decoupled from the clutch hub 42.

When the clutch C1 is in an engaged state and in a disengaged state, namely when the friction plates 43 and the separator plates 44 are in an engaged state and in a disengaged state, hydraulic oil from the lubricating system of the hydraulic control device flows to the inside of the clutch hub 42 (the space between the clutch hub 42 and the cancel plate 48) via the oil holes 61c of the drum-side coupling member 61 due to a centrifugal force. The hydraulic oil that has flowed to the inside of the clutch hub 42 is supplied throughout the spaces between each friction plate 43 and each separator plate 44 via the plurality of supply holes 421o formed in the hub portion 421 of the clutch hub 42. The friction plates 43 and the separator plates 44 in the engaged state (especially in a slip-engaged state) are thus lubricated and cooled.

As shown by thick solid arrows in FIG. 4, the hydraulic oil supplied throughout the spaces between each friction plate 43 and each separator plate 44 flows into each oil groove 72 formed between the segments 71 of each friction material 70 and is discharged to the outside of the drum portion 411 via the discharge holes 411o formed in the drum portion 411. As described above, each of the plurality of oil grooves 72 is formed next to its adjacent discharge hole 411o in the radial direction as viewed in the axial direction. The hydraulic oil can thus be smoothly guided from each oil groove 72 to the groove 411a (the discharge hole 411o adjacent to the oil groove 72) of the splines 411s of the drum portion 411 in which the external tooth 43s adjacent to the oil groove 72 is fitted, and can be satisfactorily discharged to the outside of the drum portion 411 through each discharge hole 411o. Since the plurality of discharge holes 411o are formed in the drum portion 411 so as to overlap each friction plate 43 as viewed in the radial direction, the hydraulic oil can be more smoothly guided from each oil groove 72 to its adjacent discharge hole 411o and can be more satisfactorily discharged to the outside of the drum portion 411 through each discharge hole 411o.

As described above, the opening 72o on the inner peripheral side of each oil groove 72 is formed so as to narrow as closer to the outer peripheral side. This can increase the flow velocity of the hydraulic oil that has flowed into the opening 72o on the inner peripheral side of each oil groove 72. As a result, the hydraulic oil can flow straighter in each oil groove 72, and the hydraulic oil can be more satisfactorily discharged to the outside of the drum portion 411 through the oil grooves 72 and the discharge holes 411o adjacent to the oil grooves 72.

As the capability of discharging hydraulic oil supplied throughout the spaces between each friction plate 43 and each separator plate 44 to the outside of the drum portion 411 is thus increased, the hydraulic oil can be more satisfactorily controlled not to stay inside the drum portion 411. This can more satisfactorily suppress generation of drag torque due to viscous shear resistance of hydraulic oil that is present between each friction plate 43 and each separator plate 44 when the friction plates 43 and the separator plates 44 are in a disengaged state. Since hydraulic oil is distributed more smoothly, the capability of cooling the friction plates 43 and the separator plates 44 when the friction plates 43 and the separator plates 44 are in an engaged state can also be improved. Moreover, since hydraulic oil is controlled not to stay inside the drum portion 411, peeling, chipping, etc. of the friction materials 70 bonded to the friction plates 43 due to the impact with the hydraulic oil can be satisfactorily suppressed.

As described above, in this clutch C1, the annular friction plates 43 each having the friction material 70 attached to its surfaces are fitted in the inner periphery of the cylindrical drum portion 411 of the clutch drum 41, and the annular separator plates 44 capable of frictionally engaging with the friction plates 43 are fitted on the outer periphery of the cylindrical hub portion 421 of the clutch hub 42. The drum portion 411 has the splines 411s on which the plurality of external teeth 43s of the friction plates 43 are fitted, and the plurality of discharge holes (through holes) 411o formed in the grooves 411a of the splines 411s. Moreover, each friction plate 43 has the plurality of oil grooves 72 formed at intervals in the circumferential direction of the friction plate 43 and extending in the radial direction of the friction plate 43. The plurality of oil grooves 72 are thus formed in each friction plate 43 having the friction materials 70 attached thereto. This can more satisfactorily suppress peeling, chipping, etc. of the friction materials 70 when the friction plates 43 frictionally engage with the separator plates 44 with the friction material 70 interposed therebetween, as compared to the case where the plurality of oil grooves 72 are formed in the separator plates 44. Each of the plurality of oil grooves 72 is formed next to its adjacent external tooth 43s in the radial direction as viewed in the axial direction of the friction plates 43. Hydraulic oil as a lubricating/cooling medium that is supplied throughout the spaces between the friction material 70 of each friction plate 43 and each separator plate 44 can thus be smoothly guided from each oil groove 72 to the groove 411a (the discharge hole 411o adjacent to the oil groove 72) of the splines 411s of the drum portion 411 in which the external tooth 43s adjacent to the oil groove 72 is fitted, can be satisfactorily discharged to the outside of the drum portion 411 through each discharge hole 411o, and can be more satisfactorily controlled not to stay inside the drum portion 411. This can more satisfactorily suppress generation of drag torque due to viscous shear resistance of hydraulic oil that is present between each friction plate 43 and each separator plate 44 when the friction plates 43 and the separator plates 44 are in a disengaged state. In this clutch C1, the friction materials 70 bonded to the friction plates 43 can be more satisfactorily protected, and drag torque that is generated when the clutch C1 is in a disengaged state can further be reduced.

Each of the plurality of oil grooves 72 is formed next to its adjacent discharge hole 411*o* in the radial direction as viewed in the axial direction of the friction plates 43, and the plurality of discharge holes 411*o* are formed in the drum portion 411 so as to overlap the friction plates 43 in the axial direction as viewed in the radial direction. Hydraulic oil can thus be more smoothly guided from each oil groove 72 of each friction plate 43 to its adjacent discharge hole 411*o*, and can be more satisfactorily discharged to the outside of the drum portion 411 through each discharge hole 411*o*. The plurality of discharge holes 411*o* may be formed at the positions offset in the axial direction from the friction plates 43 as viewed in the radial direction.

Moreover, the drum portion 411 has the splines 411*s* formed in the inner periphery thereof, and the plurality of discharge holes 411*o* are formed such that the outside of the drum portion 411 communicates with the grooves 411*a* of the splines 411*s*. Each friction plate 43 has the plurality of external teeth 43*s* that are fitted in the grooves 411*a* of the splines 411*s*, and each of the plurality of oil grooves 72 is formed radially inward of its adjacent external tooth 43*s*. Accordingly, by fitting the external teeth 43*s* of each friction plate 43 which are located radially outward of the oil grooves 72 in the grooves 411*a* of the splines 411*s* of the drum portion 411 which communicate with the discharge holes 411*o*, each oil groove 72 can be located next to its adjacent discharge hole 411*o* in the radial direction as viewed in the axial direction.

The openings 72*o* of the plurality of oil grooves 72 which are located on the inner peripheral side of each friction plate 43 are formed so as to narrow as closer to the outer peripheral side of the friction plate 43. This can increase the flow velocity of hydraulic oil flowing in the oil grooves 72. The hydraulic oil can thus flow straighter in each oil groove 72, and the hydraulic oil can be more satisfactorily discharged to the outside of the drum portion 411 through the oil grooves 72 and the discharge holes 411*o* adjacent to the oil grooves 72. Instead of only the openings 72*o*, the entire oil grooves 72 may be formed so as to narrow from the inner peripheral side as closer to the outer peripheral side. The hydraulic oil can thus flow much straighter in each oil groove 72.

Figure 5:
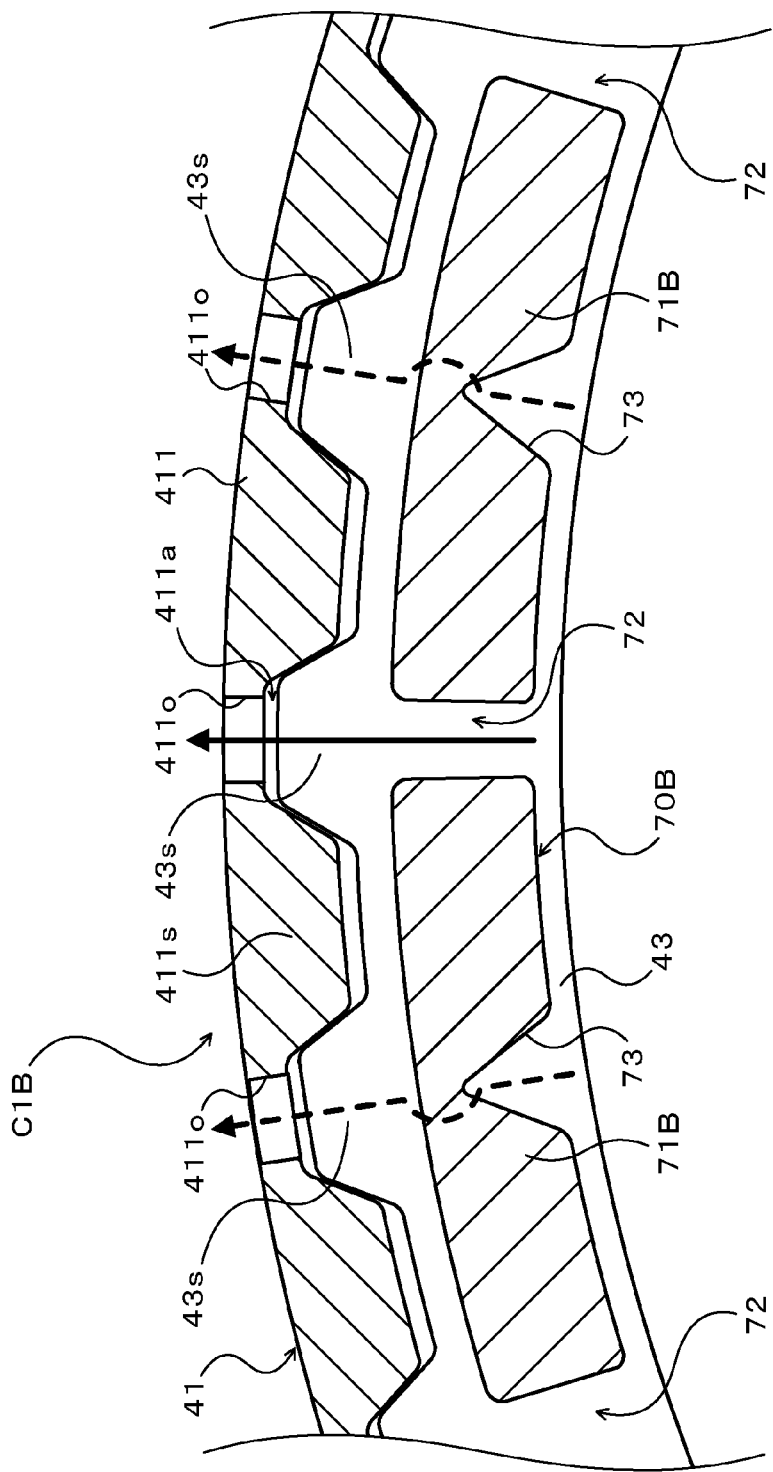
FIG. 5 is a sectional view showing a main part of a clutch as a friction engagement element according to another embodiment.

FIG. 5 is a sectional view showing a clutch C1B as a friction engagement element according to another embodiment. The clutch C1B includes, instead of the friction materials 70 of the clutch C1, friction materials 70B each having segments 71B wider than the segments 71 of the friction materials 70. Each friction material 70B has a plurality of non-through grooves 73 that are formed in each segment 71B such that the non-through grooves 73 are located between the oil grooves 72 adjoining each other and that are open on the inner peripheral side of the friction plate 43. The non-through grooves 73 may be formed by cutting out a part on the inner peripheral side of each segment 71 or may be formed by pressing each segment 71.

When hydraulic oil flows into the non-through grooves 73 of the friction materials 70, each friction plate 43 and each separator plate 44 are subjected to a force in such a direction that the friction plate 43 and the separator plate 44 are separated from each other due to the oil pressure generated in the non-through grooves 73. Clearance between each friction plate 43 and each separator plate 44 can thus be more properly maintained, which can further reduce drag torque that is generated between each friction plate 43 and each separator plate 44. Each of the plurality of non-through grooves 73 is formed next to its adjacent external tooth 43*s* and its adjacent discharge hole 411*o* in the radial direction as viewed in the axial direction. As shown by thick dashed arrows in FIG. 6, hydraulic oil having flowed into the non-through grooves 73 and thus having a reduced flow velocity can thus be satisfactorily discharged to the outside of the drum portion 411 through the discharge holes 411*o*. The shape and position of the non-through groove 73 of each segment 71 are not limited to those shown in FIG. 5. For example, a plurality of non-through grooves 73 may be formed in each segment 71. In this case, not every non-through groove 73 need necessarily be formed next to its adjacent discharge hole 411*o* in the radial direction as viewed in the axial direction.

Figure 6:
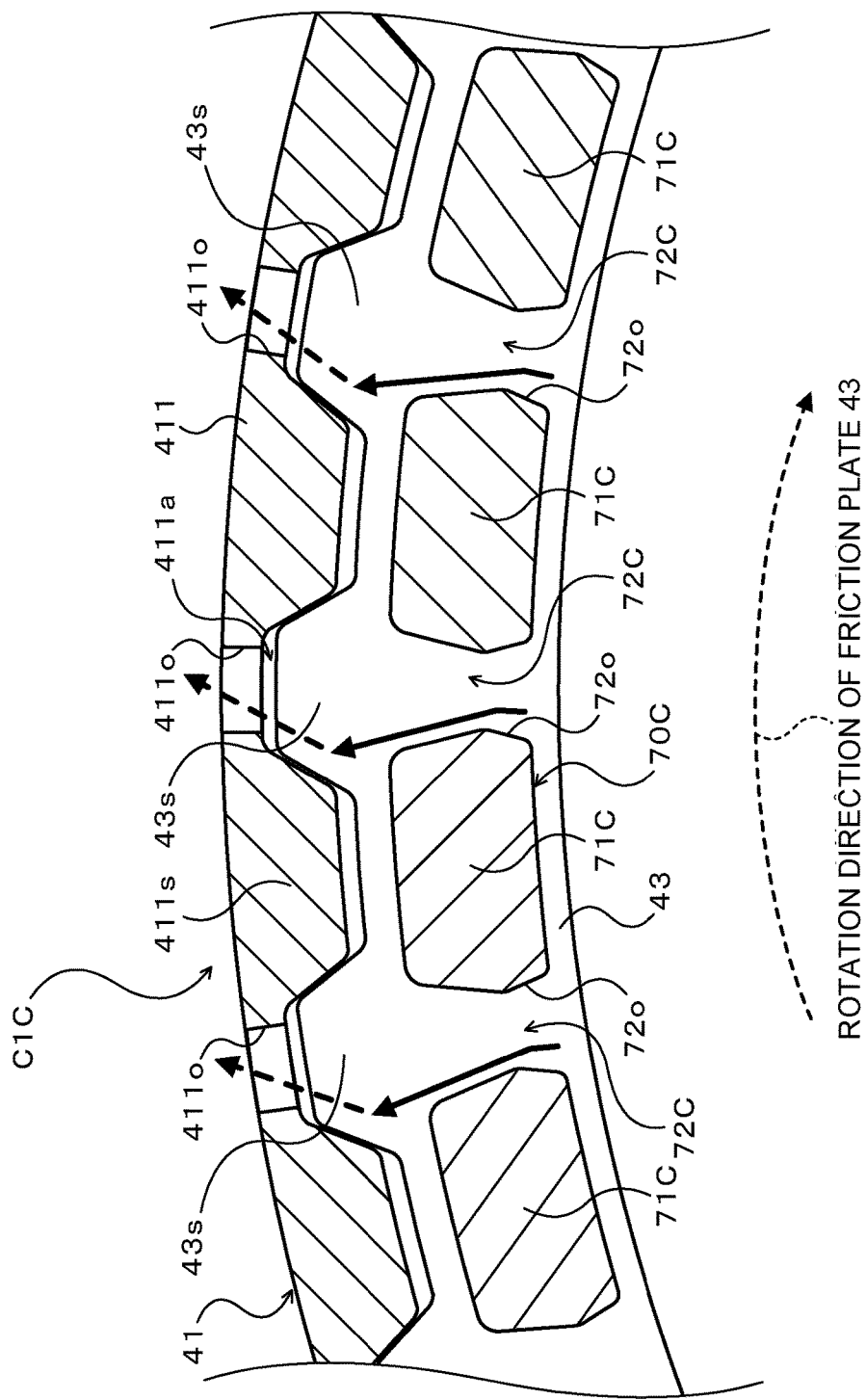
FIG. 6 is a sectional view showing a main part of a clutch as a friction engagement element according to a still another embodiment.

FIG. 6 is a sectional view showing a clutch C1C as a friction engagement element according to still another embodiment. The clutch C1C includes friction materials 70C instead of the friction materials 70 of the clutch C1. Like the friction materials 70, each friction material 70C is divided into a plurality of segments 71C. In the clutch C1C, a plurality of oil grooves 72C each formed between the segments 71C are formed such that a part of each oil groove 72C which is located on the outer peripheral side of the opening 72*o* widens as closer to the outer peripheral side. Such oil grooves 72C can be easily formed by cutting out a part on the outer peripheral side of each segment 71C.

When the rotational speed of the friction plates 43 is relatively low, hydraulic oil is subjected to a smaller centrifugal force as compared to case where the rotational speed of the friction plates 43 is relatively high. Accordingly, the hydraulic oil more tends to flow on each friction plate 43 in the opposite direction (see thick solid arrows in FIG. 6) to the rotation direction of the friction plate 43 (see a thin dashed arrow in FIG. 6) due to an inertial force. Accordingly, forming the oil grooves 72C such that a part of each oil groove 72C which is located on the outer peripheral side of the opening 72*o* widens as closer to the outer peripheral side allows hydraulic oil to flow along the oil grooves 72C when the rotational speed of the friction plates 43 is relatively low. That is, when the friction plates 43 and the separator plates 44 are in a disengaged state, hydraulic oil can be satisfactorily controlled not to flow over the oil grooves 72C and thus not to be present between the friction material 70C and the separator plate 44 when the hydraulic oil flows in the opposite direction to the rotation direction of the friction plates 43. This can more satisfactorily suppress generation of drag torque between each friction plate 43 and each separator plate 44. As shown by the thick dashed arrows in FIG. 6, hydraulic oil that has flowed along each oil groove 72C to the outer peripheral side is discharged to the outside of the drum portion 411 thorough the discharge holes 411*o* of the drum portion 411. Each oil groove 72C may be formed such that the entire oil groove 72C including the opening 72*o* widens from the inner peripheral side as closer to the outer peripheral side, or may be formed such that the entire oil groove 72C including the opening 72*o* is tilted in one direction (the opposite direction to the primary rotation direction of the friction plates 43) from the inner peripheral side as closer to the outer peripheral side.

In the above embodiment, the present disclosure is applied to the clutches C1, C1B, and C1C as wet multi-plate friction hydraulic clutches capable of connecting and disconnecting the planetary carrier 34 of the first planetary gear mechanism 30 and the first sun gear 36*a* of the second planetary gear mechanism 35 in the automatic transmission 25. However, the present disclosure may be applied to any clutch or brake as long as it is a wet friction engagement element including a drum having a cylindrical drum portion, a hub having a cylindrical hub portion, an annular friction plate fitted in the inner periphery of the drum portion and having a friction material bonded to its surface, and an annular separator plate fitted on the outer periphery of the hub portion and capable of frictionally engaging with the friction plate. The friction materials 70, 70B, and 70C are not limited to those divided into the plurality of segments 71, 71B, or 71C, and may be integral friction materials having an annular shape. In this case, the plurality of oil grooves 72, 72C can be formed by pressing the annular friction material. Not every one of the plurality of oil grooves 72, 72C need necessarily be formed next to its adjacent discharge hole 411o of the drum portion 411 in the radial direction as viewed in the axial direction.

Correspondence between the main elements of the above embodiments and the main elements of the disclosure described in "SUMMARY" will be described. In the above embodiments, the clutch drum 41 having the cylindrical drum portion 411 corresponds to the "drum," the clutch hub 42 having the cylindrical hub portion 421 corresponds to the "hub," the annular friction plate 43 fitted in the inner periphery of the drum portion 411 and having the friction materials 70 bonded to its surfaces corresponds to the "friction plate," the annular separator plate 44 fitted on the outer periphery of the hub portion 421 and capable of frictionally engaging with the friction plate 43 corresponds to the "separator plate," the clutch C1 as a wet multi-plate friction hydraulic clutch corresponds to the "friction engagement element," and the plurality of discharge holes 411o formed at intervals in the circumferential direction of the drum portion correspond to the "plurality of through holes," and the plurality of oil grooves 72 formed at intervals in the circumferential direction of the friction plate 43 and extending in the radial direction of the friction plate 43 correspond to the "plurality of oil grooves."

Although the embodiments of the present disclosure are described above, it should be understood that the present disclosure is not limited in any way to the above embodiments, and various modifications can be made without departing from the spirit and scope of the present disclosure. The above modes for carrying out the disclosure are merely shown as specific forms of the disclosure described in "SUMMARY" and are not intended to limit the elements of the disclosure described in "SUMMARY."

INDUSTRIAL APPLICABILITY

The present disclosure is applicable to manufacturing industries of friction engagement elements, automatic transmissions including the same, etc.

The invention claimed is:

1. A wet friction engagement element comprising:
a drum having a cylindrical drum portion;
a hub having a cylindrical hub portion;
an annular friction plate fitted in an inner periphery of the drum portion and having a friction material bonded to its surface; and
an annular separator plate fitted on an outer periphery of the hub portion and capable of frictionally engaging with the friction plate, wherein
the drum portion has splines on which a plurality of external teeth formed in the friction plate are fitted, and a plurality of through holes formed in grooves of the splines,
the friction plate has a plurality of oil grooves formed at intervals in a circumferential direction of the friction plate and extending in a radial direction of the friction plate, and
each of the plurality of oil grooves is located next to its adjacent one of the external teeth in the radial direction as viewed in an axial direction of the friction plate.

2. The friction engagement element according to claim 1, wherein
each of the plurality of oil grooves is located next to its adjacent one of the through holes in the radial direction as viewed in the axial direction of the friction plate, and
the plurality of through holes are formed in the drum portion so as to overlap the friction plate as viewed in the radial direction.

3. The friction engagement element according to claim 2, wherein
the drum portion has the splines formed in the inner periphery,
the plurality of through holes are formed such that outside of the drum portion communicates with the grooves of the splines,
the friction plate has the plurality of external teeth that are fitted in the grooves of the splines, and
each of the plurality of oil grooves is formed radially inward of its adjacent one of the external teeth.

4. The friction engagement element according to claim 3, wherein
an opening of each of the oil grooves which is located on an inner peripheral side of the friction plate is formed so as to narrow as closer to an outer peripheral side of the friction plate.

5. The friction engagement element according to claim 4, wherein
the friction material has a plurality of non-through grooves each formed between the oil grooves adjoining each other and each opening on the inner peripheral side of the friction plate, and
each of the plurality of non-through grooves is formed next to its adjacent one of the through holes in the radial direction as viewed in the axial direction.

6. The friction engagement element according to claim 3, wherein
the friction material has a plurality of non-through grooves each formed between the oil grooves adjoining each other and each opening on the inner peripheral side of the friction plate, and
each of the plurality of non-through grooves is formed next to its adjacent one of the through holes in the radial direction as viewed in the axial direction.

7. The friction engagement element according to claim 2, wherein
an opening of each of the oil grooves which is located on an inner peripheral side of the friction plate is formed so as to narrow as closer to an outer peripheral side of the friction plate.

8. The friction engagement element according to claim 7, wherein
the friction material has a plurality of non-through grooves each formed between the oil grooves adjoining each other and each opening on the inner peripheral side of the friction plate, and
each of the plurality of non-through grooves is formed next to its adjacent one of the through holes in the radial direction as viewed in the axial direction.

9. The friction engagement element according to claim 2, wherein
the friction material has a plurality of non-through grooves each formed between the oil grooves adjoining each other and each opening on the inner peripheral side of the friction plate, and each of the plurality of non-through grooves is formed next to its adjacent one of the through holes in the radial direction as viewed in the axial direction.

10. The friction engagement element according to claim 1, wherein the drum portion has the splines formed in the inner periphery, the plurality of through holes are formed such that outside of the drum portion communicates with the grooves of the splines, the friction plate has the plurality of external teeth that are fitted in the grooves of the splines, and each of the plurality of oil grooves is formed radially inward of its adjacent one of the external teeth.

11. The friction engagement element according to claim 10, wherein an opening of each of the oil grooves which is located on an inner peripheral side of the friction plate is formed so as to narrow as closer to an outer peripheral side of the friction plate.

12. The friction engagement element according to claim 11, wherein the friction material has a plurality of non-through grooves each formed between the oil grooves adjoining each other and each opening on the inner peripheral side of the friction plate, and each of the plurality of non-through grooves is formed next to its adjacent one of the through holes in the radial direction as viewed in the axial direction.

13. The friction engagement element according to claim 10, wherein the friction material has a plurality of non-through grooves each formed between the oil grooves adjoining each other and each opening on the inner peripheral side of the friction plate, and each of the plurality of non-through grooves is formed next to its adjacent one of the through holes in the radial direction as viewed in the axial direction.

14. The friction engagement element according to claim 1, wherein an opening of each of the oil grooves which is located on an inner peripheral side of the friction plate is formed so as to narrow as closer to an outer peripheral side of the friction plate.

15. The friction engagement element according to claim 14, wherein the friction material has a plurality of non-through grooves each formed between the oil grooves adjoining each other and each opening on the inner peripheral side of the friction plate, and each of the plurality of non-through grooves is formed next to its adjacent one of the through holes in the radial direction as viewed in the axial direction.

16. The friction engagement element according to claim 1, wherein the friction material has a plurality of non-through grooves each formed between the oil grooves adjoining each other and each opening on the inner peripheral side of the friction plate, and each of the plurality of non-through grooves is formed next to its adjacent one of the through holes in the radial direction as viewed in the axial direction.

\* \* \* \* \*